United States Patent Office 3,028,826
Patented Apr. 10, 1962

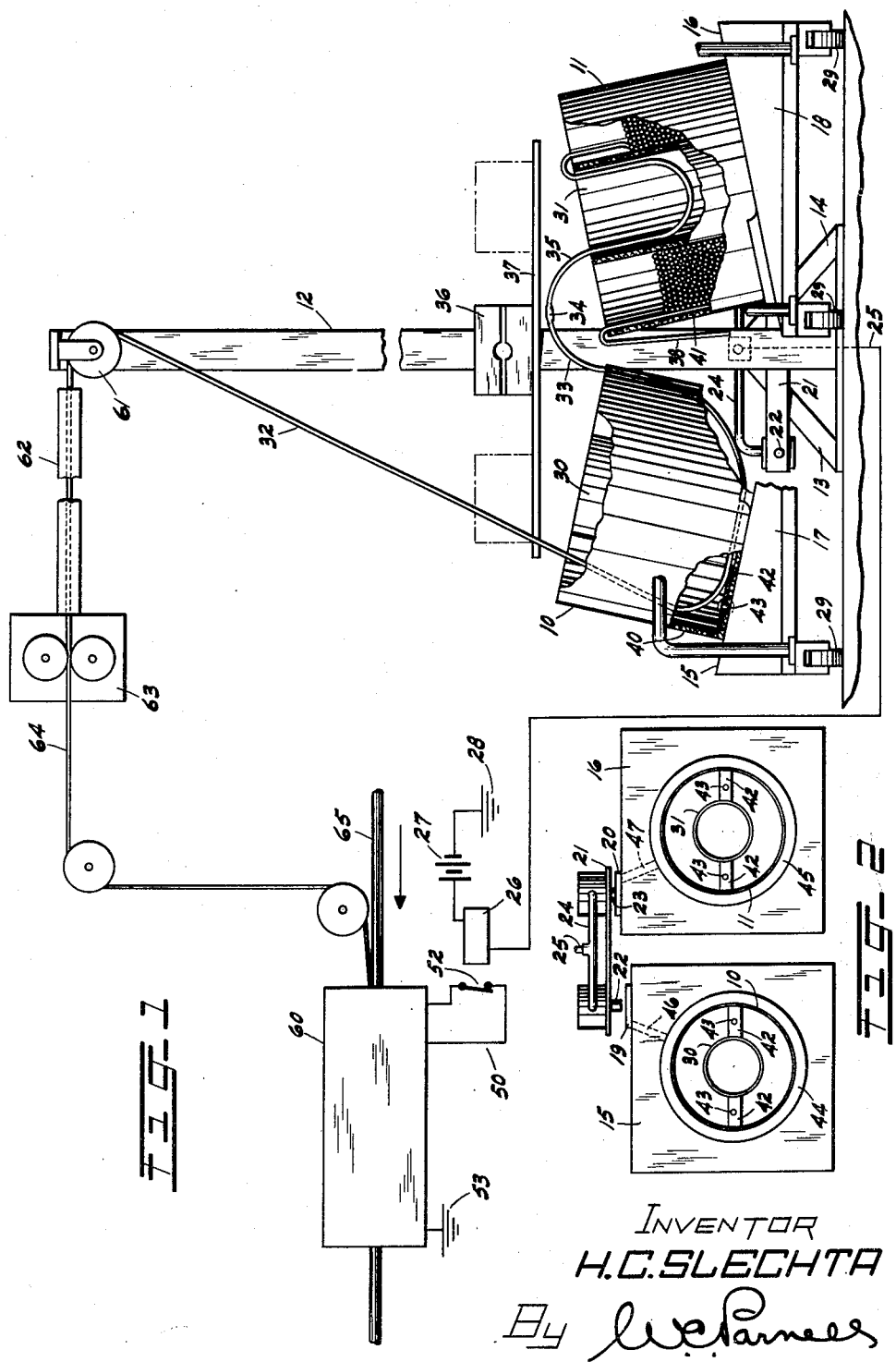

3,028,826
STRIP SUPPLY SYSTEM
Henry C. Slechta, Plainfield, N.J., assignor to Western Electric Company, Incorporated, New York, N.Y., a corporation of New York
Filed May 5, 1958, Ser. No. 733,133
4 Claims. (Cl. 113—94)

This invention relates to metal strip supplies and particularly to operations requiring a continuous supply of metal strip.

In certain operations of manufacture, it is mandatory that metal strip be continually supplied in producing certain articles of manufacture. For instance, in the cable sheathing industry, miles of continuous cable are produced upon demand and it is imperative that solder strip be supplied to seal the cable sheath. In the event that a portion of the produced cable is not soldered, the defective portion has to be cut and the desired length of the cable is destroyed. For example, in the process of sheathing cables of the general type as shown in the H. G. Johnstone patent, No. 2,589,700, which issued on March 18, 1952, after the sheath has been formed around the cable core with one edge overlapping the other, it passes adjacent a solder supply wherein flat ribbon is inserted between the overlapped edges. If the solder runs out, the sheath's edges are not joined and defective cable results.

In such operations, flat ribbon solder is preferred over wire for various reasons, one of which is its capability of melting faster than wire yet covering a larger area. In any case, it is desirable that the solder carry its own flux supply. Flux core wire is commonly manufactured whereas suitable ribbon solder is not generally available and must be acquired on special purchase at a relatively high cost. When such ribbon is utilized by drawing it from the supply as needed, it must be drawn either from small spools having low inertia which results in stopping the machine frequently to replenish the supply or from large spools requiring a special pay-off mechanism.

The object of this invention is a system for providing a continuous supply of solder in a suitable form at a relatively low cost.

According to this invention, flux cored solder wire of a type readily available is continually payed off from large supply reels or packages, through rolls which flatten it to the particular cross section desired as it is fed to the point of use. In this way, advantage is taken of the fact that wire can be payed off from the end of a stationary supply since the twists introduced from the pulling are eliminated by the flattening rollers. A continuous supply is assured by providing two (or more) such packages and connecting them in tandem to maintain a circuit which is automatically broken when the first package is exhausted unless the leading end of the second package has been connected to the trailing end of the first.

In accordance with one embodiment of the invention, as applied to the soldering of cable sheaths, the wire is payed off from a container provided with electrodes located on its inside bottom which rests on a conductive plate of a suitable truck. The truck is moved into a position whereby the conductive plate makes contact with a terminal in the stop circuit for the line. Circuit continuity is maintained due to the contact of the solder wire coil with the electrodes. A second truck and wire solder container is placed next to the first truck and means is provided for welding the leading end of the wire in the second container with the trailing end of the wire in the first, thereby insuring a continuous supply of solder. In the event that the wires are not joined and the supply becomes exhausted, contact with the electrode is broken and the stop circuit will operate causing the sheathing operation to stop, thus preventing the production of unsoldered cable. However, when the wires are joined, a continuous supply of solder is assured of passing through the flattening rollers onto the soldering phase of the cable sheathing operation.

The invention will be more fully understood from the following description, taken in connection with the appended drawing in which:

FIG. 1 is a general view of a supply system according to this invention; and

FIG. 2 is a plan view showing the relation of the trucks to the spring terminals.

In the drawing, which illustrates a preferred form of the invention, containers 10, 11 are closely spaced and defined by a vertical frame 12 supported by legs 13, 14. The containers rest on conductive plates 44, 45, preferably circular, located on the platforms 15, 16 of the hand trucks 17, 18, and contacting plates 19, 20 of suitable size are mounted on the lateral surface of said platform as shown in FIG. 2.

Located at the lower end of the frame 12 is a horizontal member 21 having spring terminals 22, 23 mounted thereon. The terminals are connected in parallel at 24 and the lead 25 passes through the winding of a relay 26 and a source of current 27 to ground at 28. Thus, when the truck is moved into position, the plate 20 makes contact with the terminal 23 as seen in FIG. 2. The wheels 29 of the truck are locked in order to secure the contact of the plate with the terminal.

Each container has an inner drum 30, 31 around which solder wire 32 is coiled in such a manner that the trailing end of wire in one container can be easily joined to the leading end in the other. As illustrated in FIG. 1, the trailing end 33 in container 10 has been joined at 34 to the leading end 35 of the wire in container 11 by a welding device 36 which is slidable along the horizontal member 37 of the frame 12. In this manner, while the wire is being fed into the machine 60, the exhausted container and truck are replaced by another supply and the trailing end of the wire in the machine is joined to the leading end of the new supply. Thus, as shown in FIG. 1, the trailing end 38 of wire in container 11 will be connected to the leading end of a new supply when container 10 has become exhausted.

Located on the inside bottom of the containers, between the outer wall 40, 41 and inner drum 30, 31, are electrodes 42, preferably flat brass plates located about 180° apart. The electrodes are secured by rivets 43 which pass through the bottom of the containers making contact with the conductive plates 44, 45 and conductors 46, 47 connect the latter to the contacting plates 19, 20.

In order to insure a continuous supply of wire to the machine, circuit continuity must be maintained. A conventional stop circuit for the machine, a portion of which is represented at 50, is brought out to include therein closed contacts 52 of the relay 26. The holding circuit for the relay extends from ground 53 to various parts of the machine 60, through the entire length of the wire passing from the machine to the feed supply to the coils resting on the electrode through the rivet and conductor to the contacting plates engaging the terminals in parallel over lead 25 to the relay and a source of current 27 to ground.

Formerly, flat ribbon solder had to be purchased at a relatively high cost as compared to solder wire. The ribbon was not coiled on large, heavy reels because of its low tensile strength and consequently would snap when drawn into the machine. Thus, being that small containers were used, coupled with the fact that such ribbon was not generally available, resulted in the high cost of the desired ribbon solder used in soldering the overlap of a cable sheath. Therefore, this apparatus provides not only for a continuous feed of solder wire which is purchased at a cheaper cost but also permits large containers to be utilized.

An over-end payoff is provided wherein the wire is drawn from the container over a pulley 61 through a tubular guide 62 of any desired length, dependent upon the location of the solder supply, into a rolling mill 63 wherein the solder is flattened, preferably into ribbon tape 64, and it subsequently passes to the machine 60 where it is inserted in the overlap of the sheath of the cable 65 and gripped and moved with the cable to a soldering unit (not shown). The rolling mill not only flattens the solder to its desired shape in the operation but eliminates the twist produced in the uncoiling of the wire in the over-end payoff.

In operation, the trucks are moved into position whereby the contacting plates 19, 20 engage the spring terminals 22, 23. The leading end of the wire in container 10 passes through the machine 60 while its trailing end is joined with the leading end of the wire in container 11. In this way, circuit continuity is maintained and when the wire supply is exhausted in container 10, the feed continues from container 11 due to its contact with the parallel terminals. Thus, by continually replacing the exhausted supply and joining the wire together, a continuous holding circuit is maintained. In the event that the trailing end of the wire is not joined and loses contact with the electrode, the circuit continuity is broken and the contacts 52 open causing the machine to stop thereby preventing the production of unsoldered cable during the interim in which the wires are quickly joined.

In other embodiments, for example, the strip supply can be wound on reels or coiled without a container and placed in contact with terminals which extend upwardly from the floor. It is, therefore, to be understood that the above described arrangements are simply illustrative of the application of the principles of the invention. Numerous other arrangements may be readily devised by those skilled in the art which will embody the principles of the invention and fall with the spirit and scope thereof.

What is claimed is:

1. In a machine for processing strip material, the combination with a plurality of coils of metal strip and a support for each of the coils of means for controlling the continuous feed of the strip to the machine, which comprises, a source of power, a strip receiving portion on the machine making electrical contact with the strip received therein, means for serially connected the coils, an electrode in each of the supports for making electrical contact with the coil placed thereon, and a circuit including a normally operated relay for stopping the machine when one coil breaks contact with its electrode unless a second coil has been connected thereto, said circuit extending from one terminal of the source of power to the strip receiving portion of the machine, the strip being supplied to the machine, to the coils on the electrodes, and from the electrodes through the relay to the other terminal of the source.

2. In a machine for processing strip material, the combination with a plurality of coils of metal strip and a container for each of the coils of means for controlling the continuous feed of the strip to the machine, which comprises a source of power, a strip receiving portion on the machine making electrical contact with the strip received therein, means for serially connecting the coils, an electrode in each of the containers for making electrical contact with the coil placed therein, a spring terminal in electrical contact with each of the electrodes, a hand truck for each terminal having a conductive platform in electrical contact with the terminal, a stop circuit for the machine, a relay having normally closed contacts in the stop circuit, and a holding circuit for the relay serially extending from ground at the machine through the wire being supplied to the strip receiving portion of the machine and coils of wire in the containers and through the platforms of the trucks and the terminals in parallel, and through the relay and source of power to ground.

3. In a system for insuring a continuous supply of solder wire which is flattened and supplied to a cable sheathing machine, comprising in combination, a frame having a plurality of spring terminals mounted thereon, a hand truck for each terminal having a conductive platform in electrical contact with the terminal, a wire coil container on each truck having a bottom electrode in electrical contact with the platform, said container supporting the coil and permitting contact between the coil and the electrode, the coils being serially connected together with one end extending into and making electrical contact with the machine, a pair of rolls intermediate the containers and the machine for flattening the wire as it passes into the machine, a stop circuit for the machine, a relay having stop circuit controlling contacts in the stop circuit, and a circuit for the relay serially extending from ground at the machine through the wire being supplied to the machine and the coils of wire in the containers and through the platforms of the trucks and the terminals in parallel and through the relay and a source of current to ground.

4. In a system for insuring a continuous supply of strip for a cable sheathing machine comprising, in combination, a frame, spring terminals mounted in spaced relation on the frame, a hand truck for each terminal having a conductive plate for supporting a wire container and connecting it to one of the terminals, an electrode mounted on the bottom portion of the container in electrical contact with the plate, a coil of wire in each container in electrical contact with the electrode therein, a horizontal support on the frame, a welding device slidably mounted on the support for serially connecting the coils together, a pair of flattening rolls intermediate the containers and the machine for flattening the wire as it passes into the machine, means for guiding the wire from one of the containers through the rolls and means for guiding the resulting strip from the rolls to the machine, a stop circuit for the machine, means for tripping the circuit when the strip supply is about to fail due to the non-connection of the coils comprising a relay having contacts in the stop circuit and a holding circuit for the relay including the strip and the wire in the containers and the spring terminals.

References Cited in the file of this patent
UNITED STATES PATENTS

| | | |
|---|---|---|
| 1,966,532 | Williams | July 17, 1934 |
| 2,349,689 | Aldrich | May 23, 1944 |
| 2,566,848 | Morton | Sept. 4, 1951 |
| 2,739,766 | Rayburn | Mar. 27, 1956 |
| 2,774,548 | Hanson | Dec. 18, 1956 |